(No Model.)

J. ADT.
COTTER PIN.

No. 324,206.  Patented Aug. 11, 1885.

Witnesses.

John Adt.
  Inventor
By Atty

UNITED STATES PATENT OFFICE.

JOHN ADT, OF NEW HAVEN, CONNECTICUT.

COTTER-PIN.

SPECIFICATION forming part of Letters Patent No. 324,206, dated August 11, 1885.

Application filed July 1, 1885. (No model.)

*To all whom it may concern:*

Be it known that I, JOHN ADT, of New Haven, in the county of New Haven and State of Connecticut, have invented a new Improvement in Cotter-Pins; and I do hereby declare the following, when taken in connection with accompanying drawings, and the letters of reference marked thereon, to be a full, clear, and exact description of the same, and which said drawings constitute part of this specification, and represent, in—

Figure 1:
Figure 2:
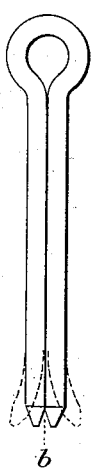
Figure 3:
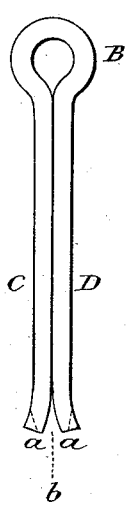
Figure 4:

Figure 1, a side view of the pin complete, ready for market; Fig. 2, side view of the pin, showing the legs closed; Fig. 3, the pin as bent prior to the cutting operation, and showing the method of forming the V-shaped recess at the point of the pin; Fig. 4, end view of the pin closed.

This invention relates to an improvement in the article of manufacture commonly called "cotter-pin"—that is to say, a pin made from doubled wire to form two elastic legs, the tendency of the elasticity being to separate the legs, but yielding so that the legs may be brought together and inserted through a hole, as in the end of a shaft to secure a wheel or pulley upon the shaft, and so that with the two legs so inserted into the hole the reaction of the elasticity will tend to secure the pin in its place. In the more general construction of this class of pins, they are made from half-round wire, and so that doubled and the flat surface brought together the two legs form a cylinder corresponding in diameter to the hole into which they are to be introduced. In many cases—as, for illustration, in roller-skates—the elasticity of the pin is not sufficient to retain the pin in place, and it will, notwithstanding the friction produced by the elasticity of the legs, frequently escape from its hole in the axle, and the same liability exists in agricultural implements where a jarring action comes upon the pin.

To prevent the escape of the pin the ends of the legs which project through the hole are bent away from each other. To so bend the legs an instrument must be introduced between their ends, and if the pins are made from half-round wire, as they are usually constructed, the projecting ends of the legs stand in close contact with each other, and so that there is no space between the two. It is therefore difficult to introduce an instrument between the two legs, but to permit such introduction of an instrument the inner surface of the two ends have been cut off, so as to leave a V-shaped space between the two, as seen in Fig. 2. The outer surface of the legs and ends is cut away to give a conical-shaped point to facilitate the introduction of the pin. The cutting away of the surface upon the inside adds very greatly to the expense of the pin, as it necessitates an independent cutting operation.

The object of my invention is to avoid the expense of this inside cutting at the ends of the legs; and it consists in making a short outward bend in the legs at the end, whereby the V-shaped space between is produced, and then cutting off the outer surface of the bent portion to give the requisite conical shape to the point of the pin, and as more fully hereinafter described.

The pin, as in the usual construction, is made from half-round wire, doubled, as seen in Fig. 3, so as to form a suitable eye or head, B, at the bend, with the two legs C D extending therefrom. In the process of bending the pin the two ends $a$ $a$ are turned outward, forming a short bend at the ends, as seen in Fig. 3, and so that as the two inner surfaces stand together, as indicated in that figure, there will be a V-shaped space, $b$, between them, the outer surface at the ends turning outward. Then the outer surface or bent-out portion is cut away, as indicated in broken lines, Fig. 3, leaving a conical-shaped termination on the pin when the two legs are closed together, as seen in Fig. 3, making the pin complete, as seen in Fig. 2. In this condition it is ready for insertion into the hole; but the elasticity of the wire is such that after bending the reaction opens the legs, as seen in Fig. 1, in the usual manner.

To introduce the pin, the two legs are brought together, as seen in Fig. 2, and then after passing through the hole an instrument may be introduced into the V-shaped recess $b$ between the two legs, and the legs bent outward, as indicated in broken lines, Fig. 2, to prevent the accidental escape of the pin.

By making the short outward bend of the two ends of the legs in the process of bending the pin, the recess is formed without additional expense, the cutting away of the metal at the end of the pin being substantially the same as in the method heretofore practiced in the production of the pins.

I claim—

The herein-described improvement in the manufacture of cotter-pins, consisting in bending the ends of the legs outward, so as to form a V-shaped recess at the ends between the two, then cutting away the outer surface of the bent portion to form a conical-shaped point, substantially as described.

JOHN ADT.

Witnesses:
J. H. SHUMWAY,
FRED. C. EARLE.